United States Patent
Roy et al.

(10) Patent No.: US 11,055,745 B2
(45) Date of Patent: Jul. 6, 2021

(54) LINGUISTIC PERSONALIZATION OF MESSAGES FOR TARGETED CAMPAIGNS

(71) Applicant: Adobe Inc., San Jose, CA (US)

(72) Inventors: Rishiraj Saha Roy, Kolkata (IN); J. Guna Prasaad, Chennai (IN); Aishwarya Padmakumar, Bangalore (IN); Ponnurangam Kumaraguru, New Delhi (IN)

(73) Assignee: Adobe Inc., San Jose, CA (US)

( * ) Notice: Subject to any disclaimer, the term of this patent is extended or adjusted under 35 U.S.C. 154(b) by 1037 days.

(21) Appl. No.: 14/566,181

(22) Filed: Dec. 10, 2014

(65) Prior Publication Data
US 2016/0171560 A1   Jun. 16, 2016

(51) Int. Cl.
*G06Q 30/00* (2012.01)
*G06Q 30/02* (2012.01)
*H04L 12/58* (2006.01)
*G06F 40/30* (2020.01)
*G06F 40/174* (2020.01)

(52) U.S. Cl.
CPC ....... *G06Q 30/0271* (2013.01); *G06F 40/174* (2020.01); *G06F 40/30* (2020.01); *G06Q 30/0276* (2013.01); *H04L 51/046* (2013.01)

(58) Field of Classification Search
CPC ............ G06Q 30/0271; G06Q 30/0276; G06F 40/30; G06F 40/174; H04L 51/046
See application file for complete search history.

(56) References Cited

U.S. PATENT DOCUMENTS

| 2006/0106604 A1* | 5/2006 | Okimoto | G10L 15/06 704/243 |
| 2009/0216524 A1* | 8/2009 | Skubacz | G06F 17/2785 704/9 |
| 2010/0153219 A1* | 6/2010 | Mei | G06F 17/27 705/14.73 |

OTHER PUBLICATIONS

Abney, "Parsing by chunks", In Principle-Based Parsing, Nov. 10, 1994, 18 pages.
Furuta, et al., "Automatically transforming regularly structured linear documents into hypertext", Electron. Publ. Origin. Dissem. Des., 2(4), Dec. 1989, pp. 211-229.
Jurafsky, et al., "Speech and Language Processing", Pearson Education, 2000., Sep. 28, 1999, 975 pages.
Kover, "Copywriters' Implicit Theories of Communication: An Exploration", Journal of Consumer Research, Mar. 1995, pp. 596-611.

(Continued)

*Primary Examiner* — Scott C Anderson
(74) *Attorney, Agent, or Firm* — FIG. 1 Patents (57) ABSTRACT

Techniques for linguistic personalization of messages for targeted campaigns are described. In one or more implementations, dependencies between keywords and modifiers are extracted, from one or more segment-specific texts and a product-specific text, to build language models for the one or more segment specific texts and the product specific text. Modifiers with a desired sentiment are extracted from the product specific text and transformation points are identified in a message skeleton. Then one or more of the extracted modifiers are inserted to modify one or more identified keywords in the message skeleton to create a personalized message for a target segment of the targeted marketing campaign.

20 Claims, 7 Drawing Sheets

(56) References Cited

OTHER PUBLICATIONS

Liu, et al., "Insertion, Deletion, or Substitution? Normalizing Text Messages without Pre-categorization nor Supervision", In HLT '11, Jun. 2011, pp. 71-76.
Schwartz, et al., "Personality, Gender, and Age in the Language of Social Media: The Open-Vocabulary Approach", PLoS ONE, 8(9):e73791, Sep. 2013, 16 pages.
Zhai, et al., "A Study of Smoothing Methods for Language Models Applied to Information Retrieval", ACM Transactions on Information Systems, vol. 22, No. 2, Apr. 2004., 2001, 34 pages.
Barzily,"Using Lexical Chains for Text Summarization", Advances in automatic text summarization, Jan. 2000, 11 pages.
Bird,"Natural Language Processing with Python", Analyzing Text with the Natural Language Toolkit, Jun. 2009, 504 pages.
Bryden,"Word usage mirrors community structure in the online social network twitter", EPJ Data Science, Feb. 25, 2013, 9 pages.
Burstein,"The Automated Text Adaptation Tool", In NAACL Demonstrations '07,, Apr. 23, 2007, 2 pages.
Cucerzan,"Spelling correction as an iterative process that exploits the collective knowledge of web users", In EMNLP '04, Jul. 1, 2004, 8 pages.
Danescu-Niculescu-Mizil,"A computational approach to politeness with application to social factors", in ACL 13, Jun. 25, 2013, 10 pages.
Danescu-Niculescu-Mizil,"No Country for Old Members: User Lifecycle and Linguistic Change in Online Communities", In WWW '13, May 13, 2013, 11 pages.
Feng,"A comparison of features for automatic readability assessment", Aug. 23, 2010, pp. 276-284.
Fleiss,"Measuring nominal scale agreement among many raters", Psychological Bulletin, Nov. 1971.
Hu,"Dude, srsly?: The Surprisingly Formal Nature of Twitter's Language", In ICWSM '13, Jun. 18, 2013, 10 pages.
Kitis,"Ads—Part of our lives: Linguistic awareness of powerful advertising", Word and Image, Sep. 1997, pp. 304-313.
Lowrey,"The Effects of Syntactic Complexity on Advertising Persuasiveness", Journal of Consumer Psychology, 7(2), Dec. 1998, pp. 187-206.
Plisson,"A Rule based Approach to Word Lemmatization", In SiKDD '04, 2004, Jul. 2004, 4 pages.
Smedt,"Pattern for Python", Journal of Machine Learning Research 13 (2012) 2063-2067, Jan. 1, 2012, 5 pages.
Socher,"Parsing with Compositional Vector Grammars", In ACL '13, Aug. 9, 2013, 11 pages.
Tan,"The effect of wording on message propagation: Topic- and author-controlled natural experiments on Twitter", In ACL '14, May 6, 2014, 11 pages.
Tausczik,"The Psychological Meaning of Words: LIWC and Computerized Text Analysis Methods", Journal of Language and Social Psychology, 2010, Mar. 2010, pp. 24-54.
Thuy,"DTD2OWL: Automatic Transforming XML Documents into OWL Ontology", In ICIS '09, Nov. 26, 2009, pp. 125-131.
Toutanova,"Feature-Rich Part-of-Speech Tagging with a Cyclic Dependency Network", In NAACL '03, May 27, 2003, 8 pages.

* cited by examiner

302
... license management tools ....

304
... specific license new management free tools ....

306
... renewable license management tools ....

308

... license management tools ....

310
... license management tools ....

312
... handy license management tools ....

*Fig. 3*

| | |
|---|---|
| Ad Message Skeleton <br> 402 | Even as the landscape continues to change, MAX will remain the place to learn about generating graphics content for devices, and discovering about tools, development approaches, and formats. Learn about license management tools and all the things you wanted to know! |
| Personalized Ad Message <br> 404 | Even as the landscape continues to change dramatically, MAX will *always* remain the first place to learn about generating original graphics content for mobile devices, and discovering about tools, unique development approaches, and formats. Learn about valuable license management tools and all the greatest things you wanted to know! |
| Personalized Ad Message <br> 406 | Even as the landscape continues to change daily, MAX will remain the first place to *quickly* learn about generating adaptive graphics content for devices, and discovering about tools, critical development approaches, and formats. Learn about handy license management tools and all the best things you wanted to know *right*! |

LINGUISTIC PERSONALIZATION OF MESSAGES FOR TARGETED CAMPAIGNS

BACKGROUND

Personalizing advertising messages for specific audience segments is an important aspect of targeted marketing campaigns. Common applications of such targeted campaigns are email campaigns, where emails with different messages can be sent to different audience segments, and social marketing, where unique advertising messages can be served to people who satisfy certain demographic properties. When a marketer has to deal with a large number of products, campaigns, or segments, manually producing multiple versions of an advertising message, each of which is personalized to appeal to each audience segment becomes very resource-intensive.

SUMMARY

Techniques for linguistic personalization of messages for targeted campaigns are described. In one or more implementations, dependencies between keywords and modifiers are extracted, from one or more segment-specific texts and a product-specific text, to build language models for the one or more segment specific texts and the product specific text. Modifiers with a desired sentiment are extracted from the product specific text and transformation points are identified in a message skeleton. Then one or more of the extracted modifiers are inserted to modify one or more identified keywords in the message skeleton to create a personalized message for a target segment of the targeted marketing campaign.

In an example implementation, a request is transmitted by a client to a service provider to linguistically personalize a textual message for one or more segments of a targeted campaign. The service provider extracts dependencies between keywords and modifiers, from one or more segment-specific texts and a product-specific text, to build language models for the one or more segment specific texts and the product specific text. The service provider extracts modifiers with a desired sentiment from the product specific text and identifies transformation points in a message skeleton. Then the service provider inserts one or more of the extracted modifiers to modify one or more keywords in the message skeleton to create a personalized message for each target segment of the targeted marketing campaign, and communicates the personalized messages to the client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Common applications of targeting advertising messages (ad messages) include email campaigns, where emails with different messages can be sent to different audience segments, and social marketing, where unique ad messages can be served to people who satisfy certain demographic properties. Conventional techniques for personalizing advertising messages typically require a copywriter to produce multiple versions of the same advertising message, with each of the multiple versions designed to appeal to a different audience segment or demographic. However, this approach requires additional time, effort, resources, and consequently expense for the advertiser. Personalization may focus on various aspects of communicating an advertising message, such as text, images, and/or video. However, in some campaigns, for example an email campaign, images and video in an advertising message may be blocked by an email client or server, so it is especially important to personalize the text in the ad message. Personalization of ad messages for a particular target segment is automated using linguistic principles and textual content generated by members of the target segment from sources such as social media, the Web, weblogs, and the like.

Techniques involving linguistic personalization of messages for targeted campaigns are described. In the following discussion, a variety of different implementations are described that involve linguistic personalization of messages for targeted campaigns. In one example, segments for a targeted campaign are identified based on desired demographic characteristics of segments of consumers for the product that will be promoted in the targeted campaign. For example, a marketer may choose to target customers in specific countries, such as Australia, the United Kingdom, and the United States. The marketer may also choose to target customers by occupation, such as designer, developer, manager, and student.

These desired target segments may have different linguistic characteristics in their communication. For example, Australian students may use different words to describe positive sentiments than managers in the United States would use. In implementations, social media and other on-line communication that can be identified by their demographics and a body (or corpus) of textual content is collected for each target segment in the targeted campaign. Additionally, a body of product-specific textual information is also collected from on-line sources.

In at least one implementation, segment-specific text, for each segment, and the product-specific text are analyzed to extract word dependencies and build language models for each of the segment-specific texts and the product-specific text. The product-specific text is analyzed to identify sentences with a desired, typically positive, sentiment expressed about the product. Modifiers (adjectives and adverbs) are extracted from those sentences and saved for use in modifying keywords (nouns and verbs) in a message skeleton.

The message skeleton is a basic version of the advertising message, typically without modifiers, that will be personalized for each segment. The message skeleton is evaluated to identify transformation points where keywords may be modified by the insertion of segment-specific modifiers. Extracted modifiers are then evaluated for insertion at the transformation points. If a modifier, which sufficiently expresses the desired sentiment in the language model of a segment, is found, the modifier is inserted to modify a keyword to personalize the message skeleton for the target segment. Personalized messages produced in this manner are then used by the marketer for communications to customers in the segment of the targeted campaign.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Although linguistic personalization of advertising messages for a product is described herein, it should be understood that the techniques herein are applicable to personalizing messages for a set of products, as well as a single product. Further, the techniques for linguistic personalization of messages are described in the context of personalizing advertising messages for targeted advertising campaigns; however, these techniques are generally applicable to personalizing textual messages based on demographic characteristics in any context. Consequently, performance of the example procedures is not limited to the advertising messages and targeted marketing campaigns.

As employed herein, the term "product" may refer to a good, an idea, information, an object, or a service created as a result of a process and that satisfies a want or need. In implementations, a product may refer to an article or substance that is manufactured or refined for sale. In at least some implementations, a product can have a combination of tangible and intangible attributes such as features, functions, and uses, which a seller offers a buyer for purchase.

As employed herein the term "targeted campaign" may refer to specific activities designed to promote a product or service. A targeted campaign can include efforts to increase awareness (e.g., consumer awareness) of the product or service. In implementations, a targeted campaign can include a coordinated series of steps such as promotion of a product or service through different mediums (e.g., television, radio, print, online, and so on) using a variety of different types of advertisements to target segments of consumers. The promotion of the product or service can focus on, or highlight, one or more attributes of the product or service to entice consumers (e.g., customers, users, and so on) to purchase the product or service. In at least some implementations, a targeted campaign can have a limited duration. Thus, a "targeted campaign" can refer to a variety of different activities related to promoting a product or service for sale. Further examples of the above-described terms may be found in relation to the following discussion.

Example Environment

Figure 1:
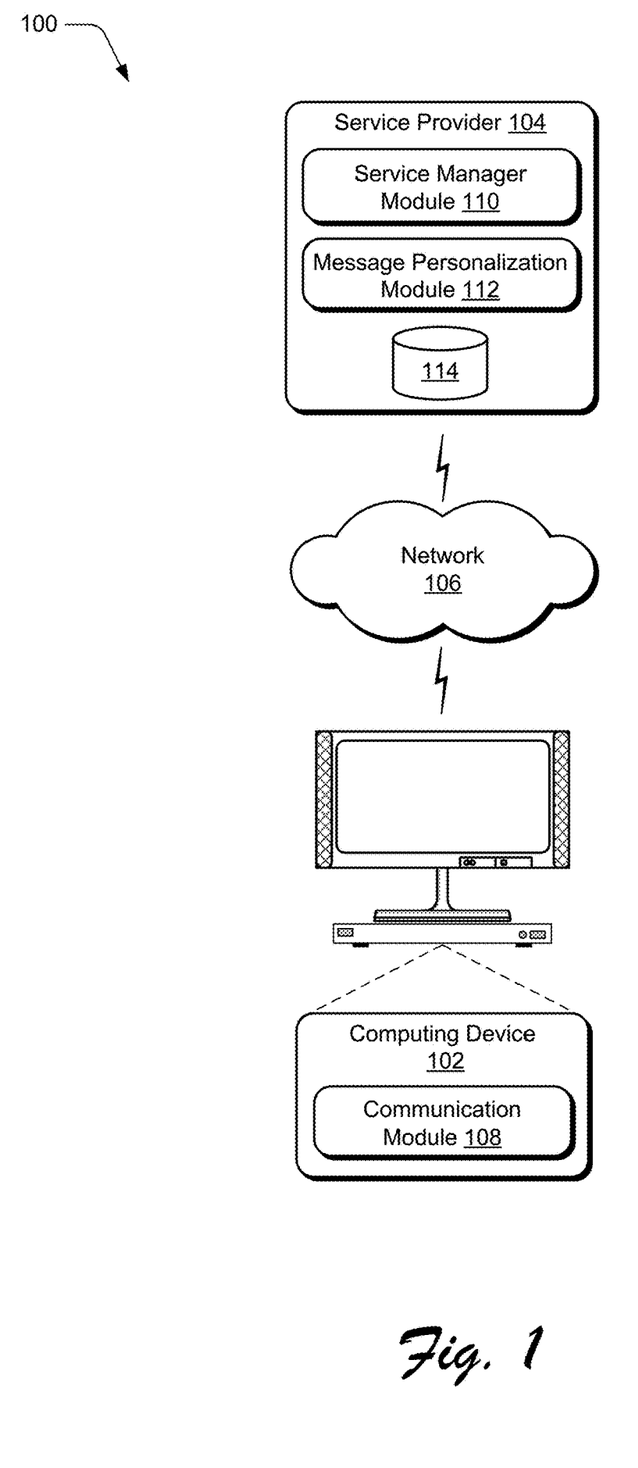
FIG. 1 is an illustration of an environment in an example implementation that is operable to employ techniques for linguistic personalization of messages for targeted campaigns.

FIG. 1 is an illustration of an environment 100 in an example implementation that is operable to employ techniques described herein. The illustrated environment 100 includes a computing device 102 and a service provider 104 that are communicatively coupled via a network 106. The computing device 102 as well as computing devices that implement the service provider 104 may be configured in a variety of ways.

The computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider 104 utilized by a business to perform operations "over the cloud" as further described in relation to FIGS. 5 and 6.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The computing device 102 is also illustrated as including a communication module 108. The communication module 108 is representative of functionality to communicate via the network 106, such as with one or more services of the service provider 104. As such, the communication module 108 may be configured in a variety of ways. For example, the communication module 108 may be configured as a browser that is configured to "surf the web." The communication module 108 may also be representative of network access functionality that may be incorporated as part of an application, e.g., to provide network-based functionality as part of the application, an operating system, and so on. Thus, functionality represented by the communication module 108 may be incorporated by the computing device 102 in a variety of different ways.

The service provider 104 is representative of functionality to provide one or more network-based services. The services are managed by a service manager module 110 to support a variety of different functionality. The services (e.g., web services), for instance, may be configured to support acquiring textual content generated by members of identified segments of the targeted campaign, acquiring textual content regarding the product advertised in the targeted campaign, and/or personalizing messages for each identified segment of the targeted campaign. These services can assist a manufacturer, a distributor, a retailer, an advertiser, or any other entity in personalizing messages for a product or service for specific customer segments in order to optimize a marketing message for each segment using language relevant to members of each segment. Thus, a variety of different types of functionalities may be performed via services supported by the service provider 104.

The service manager module 110 is configured to manage processing of data and/or content requested or provided by the computing device 102. In some instances, a user may wish to communicate with the service provider 104 to request service such as attribute selection for a product or service for use in a targeted campaign. The service manager module 110 can process the user's request and, if needed, communicate the request to an appropriate entity to properly service the request.

The service provider 104 is also illustrated as including a message personalization module 112 and storage 114. The message personalization module 112 is representative of functionality to identify modifiers with a desired, typically positive, sentiment used by members of the segments of the targeted campaign. The message personalization module 112 is configured to determine which keywords in a message to modify for each segment. In addition, the message personalization module 112 is configured to insert modifiers to personalize ad messages for each desired segment in the targeted campaign.

The storage 114 may be a component of the service provider 104, may be remote from the service provider 104, or may be a third-party database. The storage 114 may be a single database, or may be multiple databases, at least some of which include distributed data. Thus, a variety of different types of storage mechanisms can be utilized for the storage 114.

Example Implementation

The following discussion describes example implementations of linguistic personalization of messages for targeted campaigns that can be employed to perform various aspects of techniques discussed herein. The example implementations may be employed in the environment 100 of FIG. 1, the system 700 of FIG. 7, and/or any other suitable environment.

Figure 2:
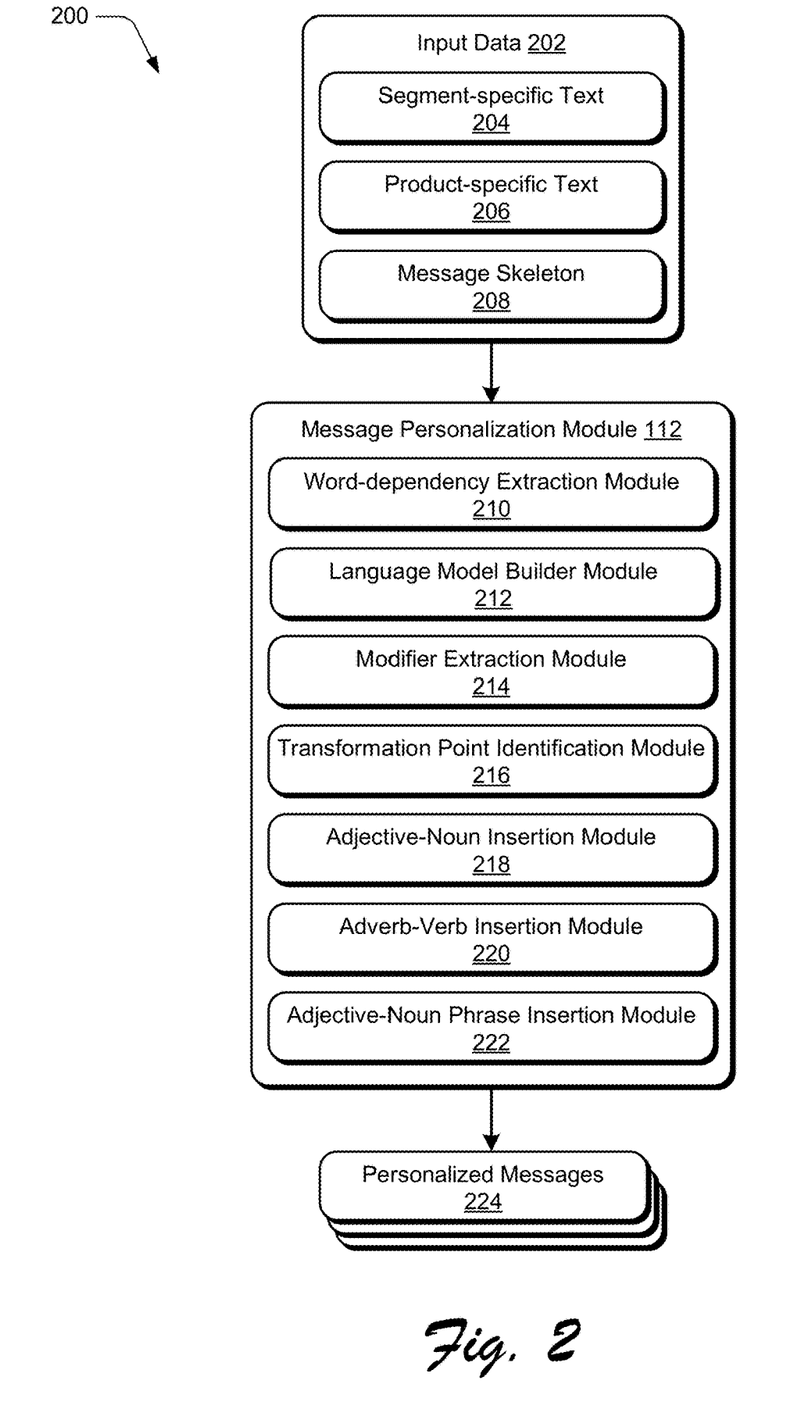
FIG. 2 is an illustration of an example implementation that is operable to employ techniques for linguistic personalization of messages for targeted campaigns.

FIG. 2 is an illustration of an example implementation 200 that is operable to employ techniques for linguistic personalization of messages for targeted campaigns. For example, input data 202 is received at the message personalization module 112. The input data 202 can include a variety of information including, for example, segment-specific text 204 that comprises a body of content generated by members of each target segment. For example, the content in the segment-specific text 204 may include information collected from social media, the Web, weblogs, and so forth. The segment-specific text 204 is associated with each target segment of the targeted campaign, based on characteristics and/or demographics of the members of the target segment, such as occupation, geographic location, and the like. In addition, the input data 202 includes product-specific text 206 that comprises a body of content relating to the product or service to be advertised in the targeted campaign. For example, the content of the product-specific text 206 may include information collected from social media, the Web, blogs, and so forth. Additionally, the input data 202 includes a message skeleton 208 that describes the product or service to be advertised. For example, the message skeleton 208 is a basic version of the ad message for the targeted campaign comprising keywords (nouns and verbs) that will be personalized using modifiers (adjectives and adverbs) for each target segment of the campaign.

The message personalization module 112 is illustrated as including a word-dependency extraction module 210, a language model builder module 212, a modifier extraction module 214, a transformation point identification module 216, an adjective-noun insertion module 218, an adverb-verb insertion module 220, and an adjective-noun phrase insertion module 222. The message personalization module 112 produces one or more personalized messages 224 from the input data 202.

In implementations, the word-dependency extraction module 210 is configured to tag words with parts of speech (POS) in the segment-specific text 204 and the product-specific text 206. The word-dependency extraction module 210 associates each word with a particular part of speech, like nouns, verbs, adjectives, adverbs, and so forth. The word-dependency extraction module 210 parses the POS-tagged text to identify adjacent, and long-range or nonadjacent dependencies or associations within the text. For example, the parsing extracts noun-adjective associations, such as the adjective fast is associated with the noun software in the sentence fragment, "fast and dependable software," even though fast and software do not appear adjacent to each other in the text of the sentence fragment.

The word-dependency extraction module 210 performs lemmatization on the parsed text, so that different forms of the same word are considered equivalent during subsequent processing. Lemmatization normalizes words to their base forms or lemmas. For example, radius and radii are lemmatized to radius (singular/plural), and bring, bringing, brought and brings are all converted to bring (different verb forms).

In implementations, the language model builder module 212 is configured to build language models for the segment-specific text 204 and the product-specific text 206. A language model is a statistical model of a probability distribution of the probabilities of occurrence of each n-gram, for example a unigram (single word), a bigram (pair of words), and so forth, over all strings in a language. The language model builder module 212 extracts distinct (i.e., unique) n-grams from the segment-specific text 204 for each segment and the product-specific text 206 and computes the occurrence probability for the extracted n-grams to build a language model for the segment-specific text 204 for each segment of the targeted campaign and the language model for the product-specific text 206.

The language model for each segment is used as a source to search for the most appropriate modifiers to use in personalizing a message for that segment. Although any range of n-grams may be used to build the language models, the desired accuracy of personalization may be achieved with less computational expense by selecting a limited range of n-grams, for example unigrams and bigrams. Further, sentence-level and/or frequency-level probabilities may be used to compute the probabilities in the language models. Sentence level probability for an n-gram, N, in a body of textual content (corpus) is defined as:

$$P_s(N) = \frac{\text{Number of sentences in corpus with } N}{\text{Number of sentences in corpus}} \quad (1)$$

Frequency level probability for an n-gram, N, is defined as:

$$P_f(N) = \frac{\text{Frequency of } N \text{ in corpus}}{\text{Total number of } n-\text{grams in corpus}} \quad (2)$$

Additionally, the language model builder module 212 determines and stores the occurrence probabilities of all distinct modifier-keyword pairs (adjective-noun pairs and adverb-verb pairs) in the language models.

In implementations, the modifier extraction module 214 extracts modifiers from the product-specific text 206. The modifier extraction module 214 extracts content from the product-specific text 206 and performs a sentiment analysis of the extracted text. The modifier extraction module 214 retains sentences from the text that have a desired, typically positive, sentiment associated with the sentences. The modifier extraction module 214 performs POS-tagging on the retained sentences and extracts the modifiers (adjectives and adverbs) with the desired sentiment from the retained sentences.

In implementations, the transformation point identification module 216 performs POS-tagging on the message skeleton 208 to identify keywords in the message. The transformation point identification module 216 computes term weights for the keywords based on inverse document frequency. The term weights provide a basis to determine which of the keywords in the message will be modified, such as keywords that are discriminative in a context as opposed to words of daily usage, such as have or been. The term weight for a keyword in the product-specific text 206, which comprises a plurality of product-specific messages, is defined as:

$$IDF(\text{keyword}) = \frac{\text{Product-specific messages}}{\text{Product-specific messages with keyword}} \quad (3)$$

The term weights for the keywords may be compared to term-weight thresholds for nouns and verbs, $\alpha_N$ and $\alpha_V$, for a noun-term-weight threshold and a verb-term-weight threshold, respectively. The term-weight thresholds may be established by a user, based on the message skeleton 208, or determined programmatically by the message personalization module 112. Only noun and verb keywords that exceed their respective term-weight thresholds will be considered as transformation points for the insertion of modifiers to personalize the message skeleton 208 for each target segment.

In implementations, for each noun in the message skeleton 208 that has a term weight above the noun-term-weight threshold, $\alpha_N$, the adjective-noun insertion module 218 fetches a set of adjectives, ADJ(n). The set of adjectives comprises adjectives extracted by the modifier extraction module 214 that appear in the content with the desired sentiment and that have a non-zero probability of co-occurrence with a corresponding noun, n, in the target language model for a segment. Adjectives in the set of adjectives, ADJ(n), need to have appeared a minimum number of times in the segment-specific text 204, as defined by an appearance threshold, $\beta$, to be considered for insertion. Candidate adjectives with a frequency less than the appearance threshold, $\beta$, are not considered for insertion as a modifier. The adjective-noun insertion module 218 prunes the set of adjectives by retaining only those adjectives, adj, that meet a constraint of having a pointwise mutual information (PMI) greater than a noun-modification threshold, $\gamma_N$, on the right side of the adjective, adj, with the noun n, and on the left side of the adjective, adj, with a preceding word, w. If there is no preceding word in this ad message, the adjective-noun insertion module 218 ignores the left side condition for the preceding word, w.

PMI is a word association measure computed for a pair of words or a bigram, (a b), that takes a high value when a and b occur more frequently than expected by random chance, and is defined as:

$$PMI(ab) = \log_2 \frac{p(a, b)}{p(a)p(b)} \quad (4)$$

The occurrence of a and b may be considered in calculating PMI only when a and b are ordered or may be considered regardless of order. Hence, if the sequence <a b> has a high PMI, it is an indication that the sequence is syntactically coherent. Thus, choosing an adjective, adj, such that PMI(w adj)>$\gamma_N$ (left bigram) and PMI(adj n)>$\gamma_N$ (right bigram) ensures that inserting adj before n will ensure a readable sequence of three words. For example, if the original text had with systems, and complex is identified as a candidate adjective for systems, the PMI scores of with complex and complex systems would be expected to be higher than $\gamma_N$. This ensures that the adjective complex fits in this context, and with complex systems produces locally readable text.

The adjective-noun insertion module 218 evaluates the PMI of candidate adjectives to produce a list of adjectives that satisfies the constraint of having a PMI greater than the noun-modification threshold, $\gamma_N$. The adjective-noun insertion module 218 ranks this list by PMI, PMI(adj, n), and the adjective-noun insertion module 218 inserts the highest ranking adjective, adj, to the left of the noun, n.

In implementations, for each verb in the message skeleton 208 that has a term weight above the verb-term-weight threshold, $\alpha_V$, the adverb-verb insertion module 220 fetches a set of adverbs, ADV(v). The set of adverbs comprises adverbs extracted by the modifier extraction module 214 that appear in the content with the desired sentiment and that have a non-zero probability of co-occurrence with the corresponding verb, v, in the target language model for a segment. The adverb-verb insertion module 220 considers only main verbs, which convey the main actions in a sentence, for the insertion as modifiers. The adverb-verb insertion module 220 removes modal and auxiliary verbs, such as have, are, will, and shall that only add functional or grammatical meaning to the clauses in which they appear. Adverbs in ADV(v) need to have appeared the minimum number of times $\beta$ in the segment-specific text 204, as defined by the appearance threshold, $\beta$, to be considered for insertion. Candidate adverbs with a frequency less than the appearance threshold, $\beta$, are not considered for insertion as a modifier. The adverb-verb insertion module 220 prunes the set of adverbs ADV(v) by retaining only those adverbs that meet a constraint of having a pointwise mutual information (PMI) greater than a verb-modification threshold, $\gamma_V$, on the right side of the adverb, adv, with the verb, v: PMI(adv v)>$\gamma_V$, or a PMI greater than the verb-modification threshold, $\gamma_V$, on the left side of the adverb, adv, with the verb, v: PMI(v adv)>$\gamma_V$.

The adverb-verb insertion module 220 evaluates the PMI of candidate adverbs to produce a list of adverbs that satisfies the PMI constraints. The adverb-verb insertion module 220 ranks the list of adverbs in order of their PMI scores using the higher PMI value of the two PMI values PMI(adv v)>$\gamma_V$ and PMI(v adv)>$\gamma_V$. For each adverb, the adverb-verb insertion module 220 selects the highest-ranking adverb, adv, for insertion into the message skeleton 208. If PMI(adv v)>PMI(v adv), and there is no word in the sentence that precedes the verb, v, then the adverb, adv, is inserted before the verb, v. If there is a word, w, preceding the verb, v, then the adverb-verb insertion module 220 inserts the selected adverb only if PMI(w adv)>$\gamma_V$. If PMI(adv v)<PMI(v adv), and there is no word in the sentence that succeeds the verb, v, then the adverb-verb insertion module 220 inserts the selected adverb, adv, after the verb, v. If there is a word, w, succeeding the verb, v, then the adverb-verb insertion module 220 inserts the selected adverb, adv, only if PMI(adv w)>$\gamma_V$. If the two PMIs are equal, then the adverb-verb insertion module 220 randomly chooses to insert the selected adverb to the left side or the right side of the verb, v.

If the adverb-verb insertion module 220 determines that the highest-ranking adverb, adv, is found unsuitable for insertion with respect to any of the constraints in the paragraph above, then the adverb-verb insertion module 220 evaluates the next-ranked adverb in the list of adverbs as described above. If the evaluation of the next-ranked adverb determines that the next-ranked adverb is unsuitable for insertion, the adverb-verb insertion module 220 repeats the evaluation using the remaining ranked adverbs in the adverb list until either a suitable adverb is found for insertion as a modifier or the list of adverbs is exhausted.

A noun phrase is a phrase that has a noun (or an indefinite pronoun) as a head-word of the phrase. Nouns embedded inside noun phrases may result in unusual results using the adjective-noun insertion described above. For example, and with respect to FIG. 3, a noun phrase, license management tools, is shown at 302. For example, using adjective-noun insertions, for license, management, and tools, results in an adjective insertion to modify each noun that results in a nonsensical, modified noun phrase, specific license new management free tools, as shown at 304. To avoid these types of undesirable insertions, the message personalization module 112 does not insert adjectives within noun phrases. Further, simply inserting an adjective to modify the first noun in the noun phrase may also result in a modification that is not always appropriate, such as renewable license management tools, as shown at 306. As is apparent from this example, inserting an adjective for the first word in the noun phrase is not always appropriate.

Figure 3:
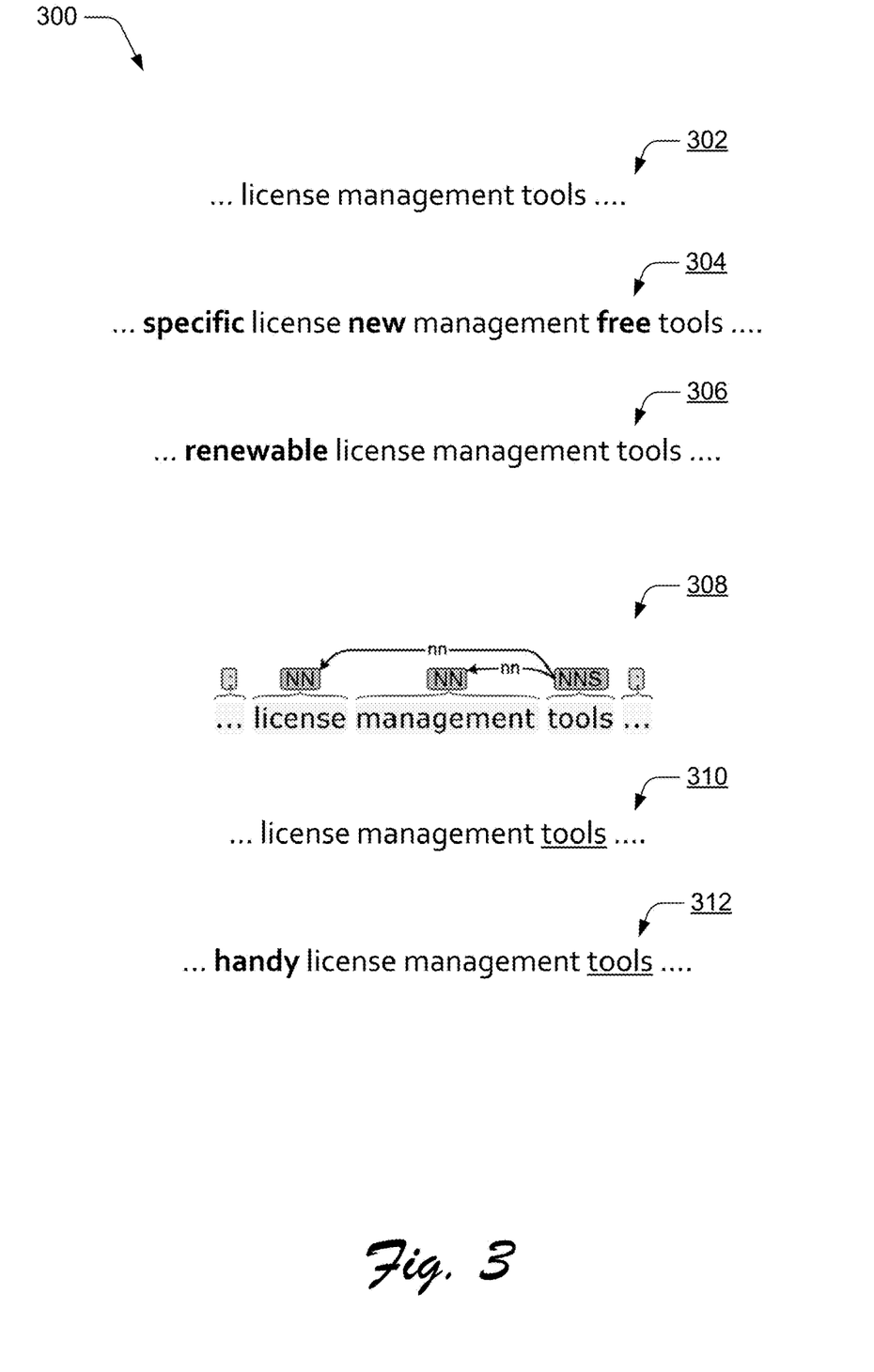
FIG. 3 is an illustration of an example of techniques for adjective-noun phrase insertion.

In implementations, the adjective-noun phrase insertion module 222 performs noun phrase chunking on the message skeleton 208 to detect noun phrases in the message skeleton 208 and to avoid inserting inappropriate modifiers, such as in the examples, above. The head-word is the word in a phrase upon which the other words in the phrase depend. To insert an adjective for a noun phrase, the adjective-noun phrase insertion module 222 performs dependency parsing, shown at 308, to identify the head-word in the noun phrase, "tools" as underlined at 310, using a dependency tree of the sentence.

The adjective-noun phrase insertion module 222 performs the process described for the noun-adjective insertion module 218, above, to insert an adjective modifier for the head-word before the first word of the noun phrase. In this example inserting the adjective handy (shown in bold at 312) to modify the head of the noun phrase, tools.

The adjective-noun phrase insertion module 222 checks the PMI for compatibility in context using the word immediately preceding the chunked noun phrase (as described with respect to the evaluation of the left bigram by the adjective-noun insertion module 218, above). Further, the adjective-noun phrase insertion module 222 determines if the adjective selected for insertion, as a modifier, is already part of the noun phrase. If the selected adjective is determined to be part of the noun phrase, the adjective-noun phrase insertion module 222 does not insert the selected adjective.

Figure 4:
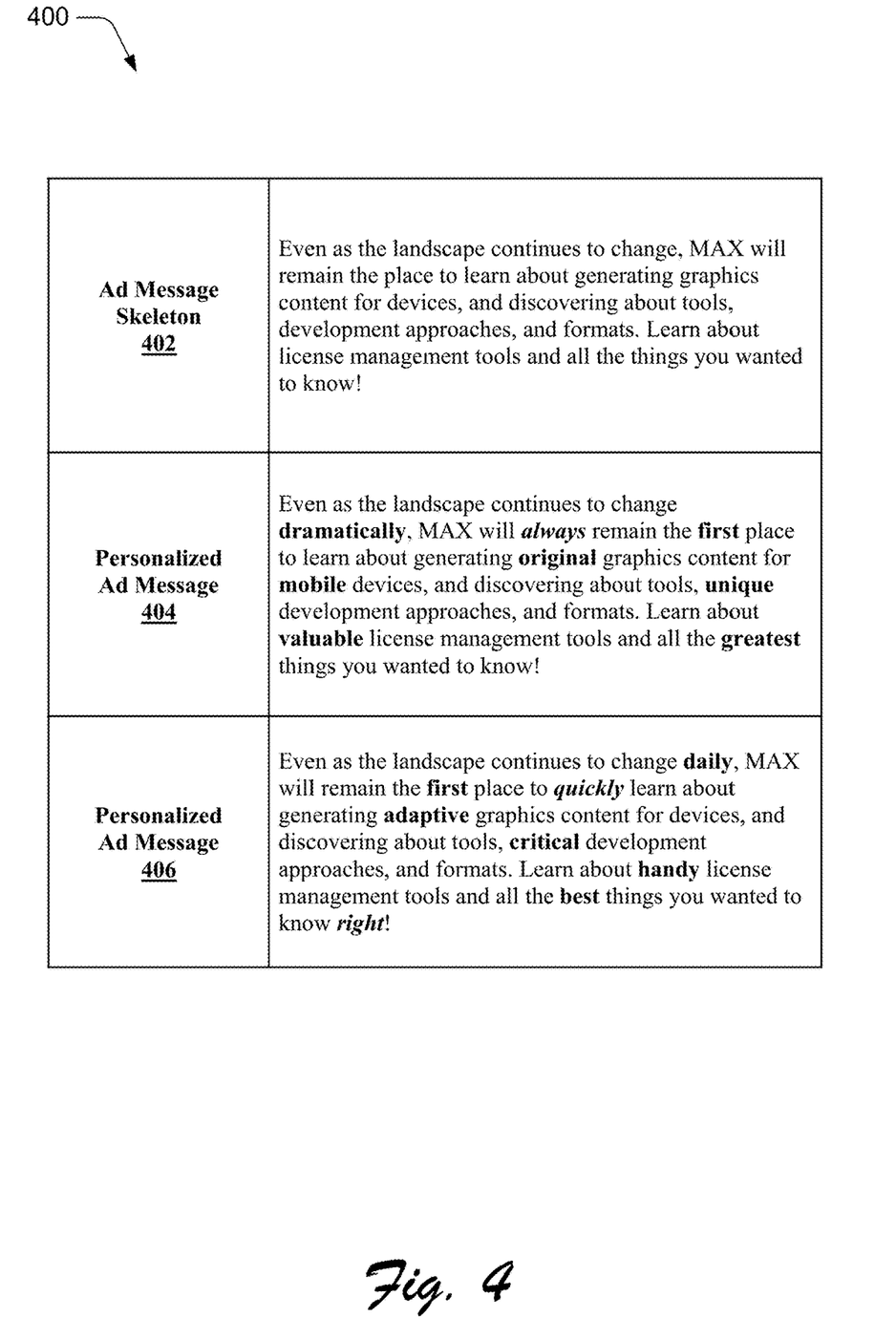
FIG. 4 is an illustration of an example of an ad message skeleton and resulting segment-specific personalized messages.

FIG. 4 is an illustration of an example result of linguistic personalization of messages for targeted campaigns in which an ad message skeleton 402 was supplied as the message skeleton 208. The ad message skeleton 402 has been personalized for two target segments, shown as personalized ad message 404 and personalized ad message 406. The inserted modifier adjectives are shown in bold and the inserted modifier adverbs are shown in bold-italics in the personalized ad messages, 404 and 406, in FIG. 4. The differences between the modifier insertions that personalize the messages in the personalized ad message 404 and the personalized ad message 406, are a result of extracting the modifiers (adjectives and adverbs) from the segment-specific texts 204 that correspond to the target segments for the respective personalized ad messages, 404 and 406.

The personalized ad messages can be evaluated to determine if the inserted modifiers move the message skeleton 208 closer to the target language model by measuring the cross-entropy between the language models:

$$CE(p,q) = \Sigma_{i=1}^{n} -p_i \log_2 q_i \quad (5)$$

where $p_i$ and $q_i$ refer to corresponding points in the two probability distributions (language models) for the product-specific and the target language models. Calculating the cross entropy of the personalized ad messages shows that the techniques described herein are successful in making the personalized ad messages ads approach the target language models in all cases.

Example Procedures

The following discussion describes techniques for linguistic personalization of messages for targeted campaigns that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 5:
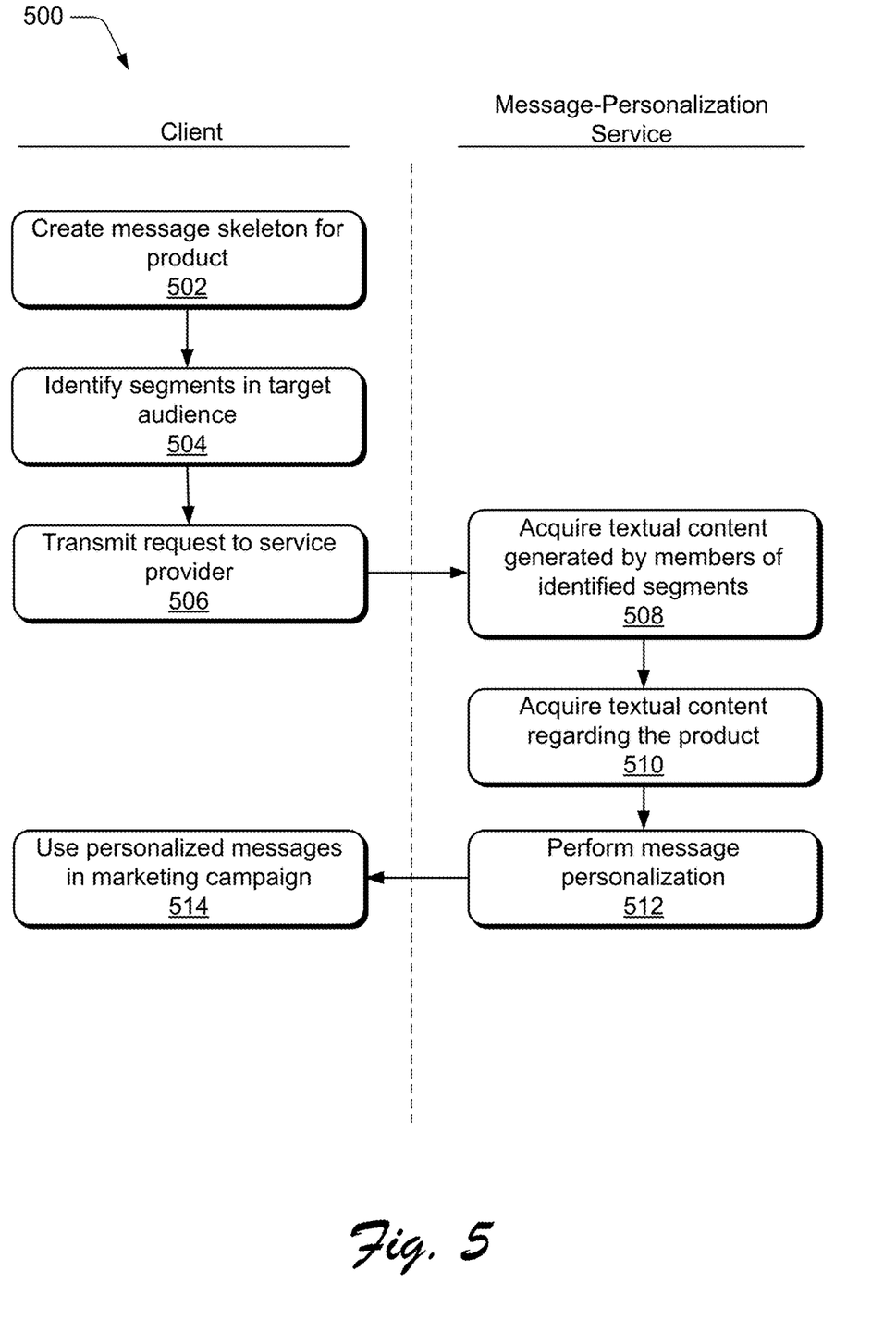
FIG. 5 is a flow diagram depicting a procedure in an example implementation in which techniques for linguistic personalization of messages for targeted campaigns are employed.

FIG. 5 is a flow diagram depicting a procedure in an example implementation in which techniques for linguistic personalization of messages for targeted campaigns are employed. A message skeleton is created for a product or service that will be advertised in the targeted campaign (block 502). This can be performed in any suitable way. For example, a copywriter writes a message skeleton comprising the keywords for the product that will be modified for each target segment in the audience.

Segments in the target audience are identified (block 504). For example, the advertiser of the product or service determines which segments of the audience to target based on various demographic attributes, for example geographic location, occupation, and so forth.

A request to a service provider is transmitted (block 506). In at least some implementations, the request includes the created message skeleton and identified segments in the target audience. The request can optionally include product-specific and/or segment-specific modifiers, if the advertiser is already in possession of those modifiers.

Once the request is received at the service provider, the service provider acquires textual content generated by members of the identified segments of the audience (block 508). This can be performed in any suitable way. For example, the message personalization service can acquire textual content generated by members of the identified segments from any suitable source, such as social media sites, websites, and/or weblogs that contain textual content identified as being produced by members of the target segment.

The service provider acquires textual content regarding the product (block 510). This can be performed in any suitable way. For example, the message personalization service can acquire textual content regarding the product from any suitable source, such as social media sites, websites, and/or weblogs that contain textual content regarding the product.

Message personalization is performed using the acquired textual content generated by members of the identified segments and acquired textual content regarding the product (block 512). This can be performed in any suitable way, examples of which are described above. For example, message personalization can include extracting word dependencies from textual content, building a language model, extracting modifiers from textual content, and identifying transformation points in the message skeleton. In implementations, modifiers are inserted to modify keywords at one or more transition points. The modifiers include adjectives and adverbs, and the keywords include nouns, verbs, and noun phrases.

One or more personalized messages are transmitted to the requesting entity (e.g., client) to response to the request. Subsequently, the messages can be used in targeted campaigns (block 514). In implementations, the requesting entity can use the personalized messages in various forms of advertising, such as social media advertising, an email campaign, and so forth. Accordingly, the requesting entity can optimize the targeted campaign for the product or service by personalizing the advertising message using language that has a desired sentiment and is common amongst members of each target segment.

Figure 6:
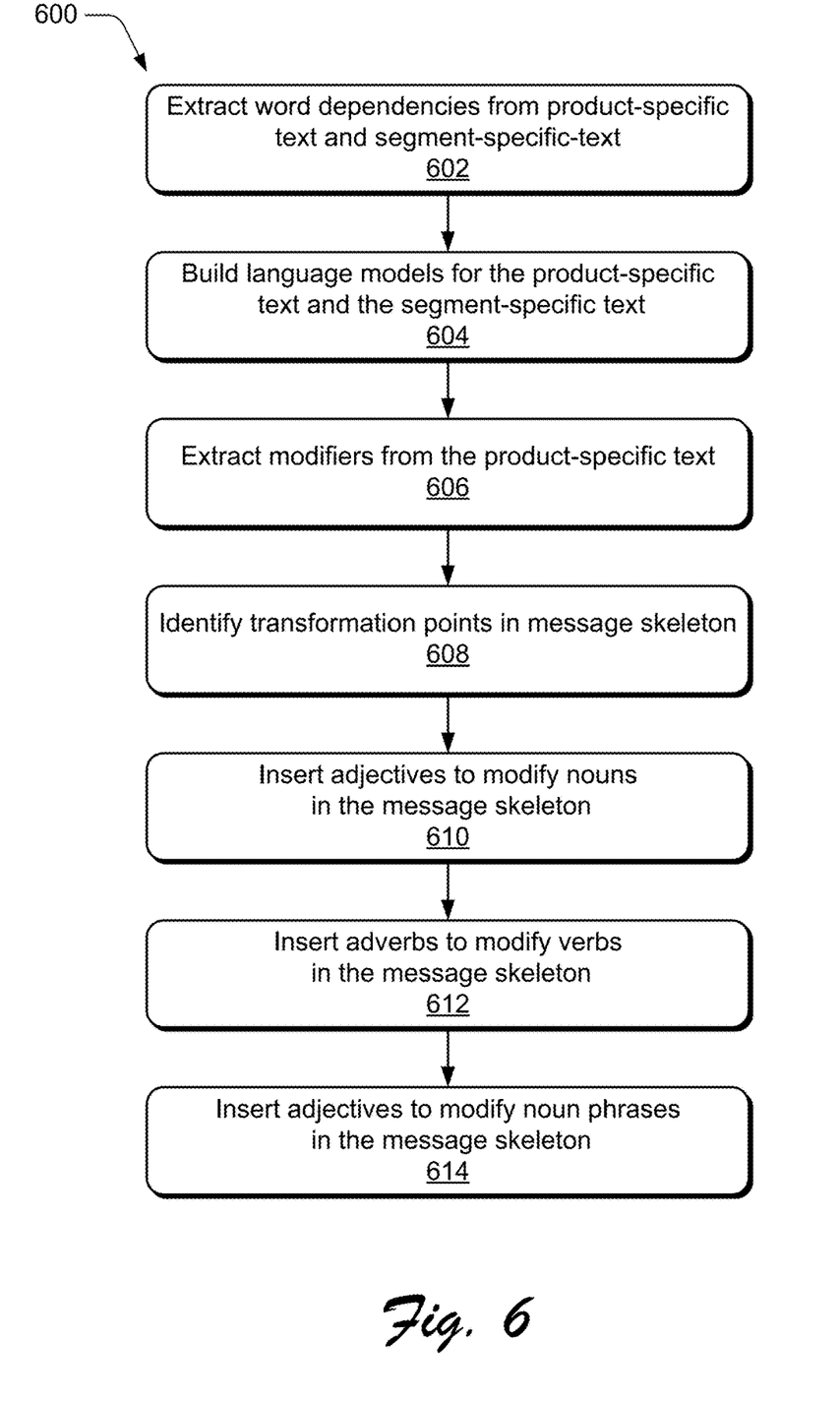
FIG. 6 is a flow diagram depicting a procedure in an example implementation in which techniques for linguistic personalization of messages for targeted campaigns are employed.

Having discussed a general procedure with respect to FIG. 5, consider now a discussion of FIG. 6, which is a flow diagram depicting a procedure 600 in an example implementation in which techniques for linguistic personalization of messages for targeted campaigns are employed.

Word dependencies are extracted from product-specific text and segment-specific text (block 602). This can be performed in any suitable way, examples of which are described above. For example, the word-dependency extraction module 210 tags words with POS, identifies adjacent and long-range dependencies and associations, and lemmatizes words to their base lemmas.

Language models are built for the product-specific text and the segment-specific text (block 604). This can be performed in any suitable way, examples of which are described above. For example, the language model builder module 212 creates a statistical model of a probability distribution of the occurrence of each n-gram in the segment-specific text 204 and the product-specific text 206 over all strings in the language, and determines and stores the occurrence probability of all distinct adjective-noun pairs and adverb-verb pairs in the language models.

Modifiers are extracted from the product-specific text (block 606). This can be performed in any suitable way, examples of which are described above. For example, the modifier extraction module 214 extracts text from the product-specific text 206, performs a sentiment analysis of the extracted text, retains sentences from the text that include modifiers with a desired sentiment, and performs POS-tagging on the retained sentences.

Transformation points are identified in a message skeleton (block 608). This can be performed in any suitable way, examples of which are described above. For example, the transformation point identification module 216 performs POS-tagging on the message skeleton 208 to identify keywords, computes term weights for the keywords, compares the computed term weights for the keywords to respective term-weight thresholds for nouns and verbs, and identifies noun and verb keywords that exceed their respective term-weight thresholds as transformation points in the message skeleton 208.

Adjectives are inserted to modify nouns (block 610). This can be performed in any suitable way, examples of which are described above. For example, the adjective-noun insertion module 218 fetches a set of adjectives for each noun that exceeds the noun-term-weight threshold, determines if the adjectives in the set of adjectives have appeared a minimum number of times in the segment-specific text 204, and ranks the adjectives that have appeared at least the minimum number of times in the adjective set by the PMI of each adjective, and inserts the highest ranking adjective as a modifier for the noun.

Adverbs are inserted to modify verbs (block 612). This can be performed in any suitable way, examples of which are described above. For example, the adverb-noun insertion module 220 fetches a set of adverbs for each verb that exceeds the verb-term-weight threshold, determines if the adverbs in the set of adverbs have appeared a minimum number of times in the segment-specific text 204, ranks the adverbs that have appeared at least the minimum number of times in the adverb set by the PMI for each adverb, and inserts the highest ranking adverb is a modifier for the verb.

Adjectives are inserted to modify noun phrases (block 614). This can be performed in any suitable way, examples of which are described above. For example, the adjective-noun phrase insertion module 222 chunks the message skeleton 208 to detect noun phrases and the head-word of each detected noun phrase. The additive-noun phrase insertion module 222 inserts an adjective for the head-word in a manner similar to that described with respect to the adjective-noun insertion module 218, at block 610.

Example System and Device

Figure 7:
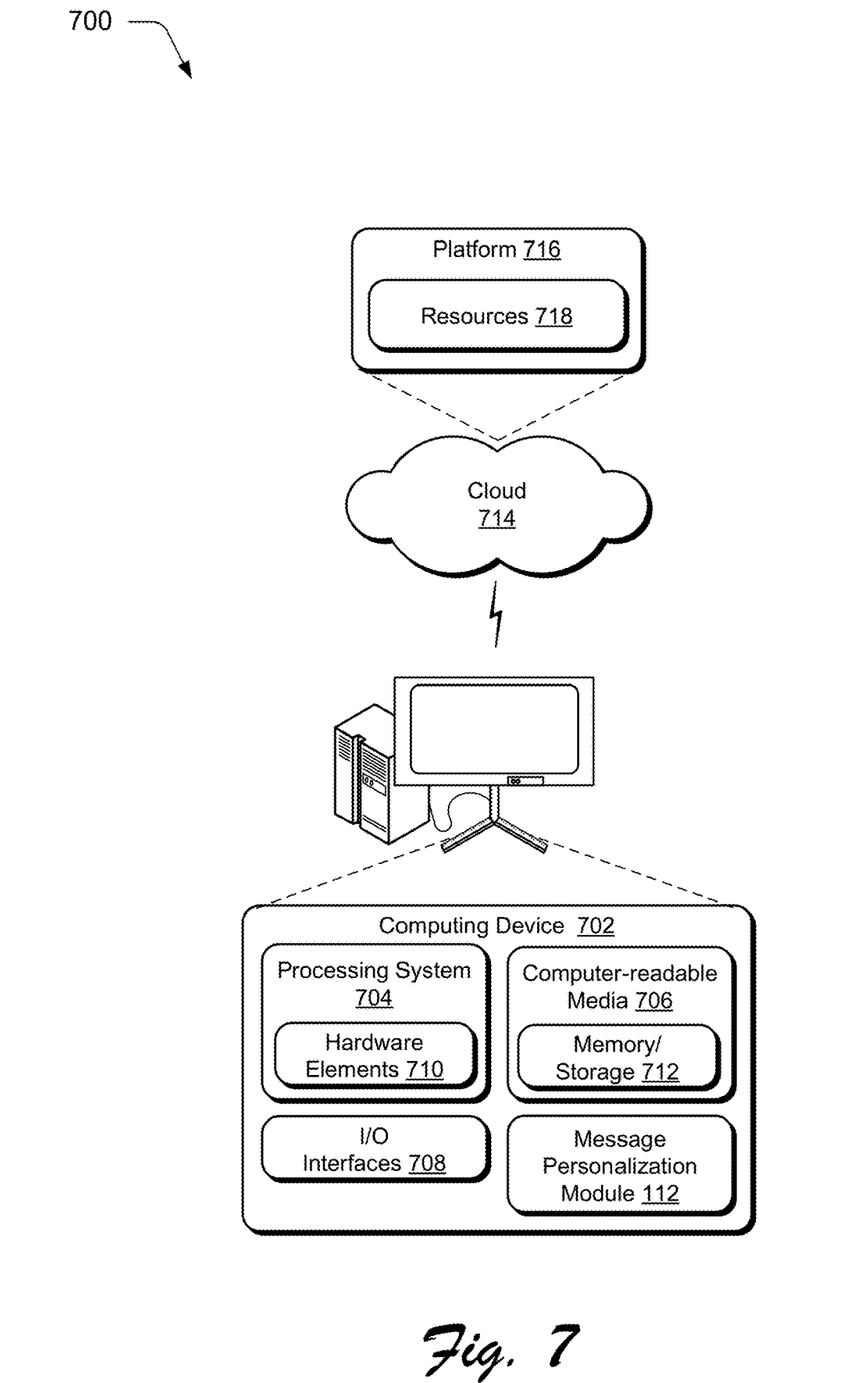
FIG. 7 illustrates various components of an example device that can be implemented as any type of computing device as described herein to implement the techniques described herein.

FIG. 7 illustrates an example system generally at 700 that includes an example computing device 702 that is representative of one or more computing systems and/or devices that may implement the various techniques described herein. This is illustrated through inclusion of message personalization module 112, which may be configured to personalize messages in a targeted campaign. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

The input/output interface(s) 708 are representative of functionality to allow a user to enter commands and information to the computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and the computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or the hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of the platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. The resources 718 can also include services 720 provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method for controlling textual message output, the method comprising:
   retrieving, by at least one computing device, a message skeleton;
   modifying, by the at least one computing device, the message skeleton to generate a personalized textual message for a segment of users associated with a segment-specific text by:
      extracting, by the at least one computing device, word dependencies between keywords and modifiers in the segment-specific text and a product-specific text,
      building, by the at least one computing device, language models for the segment-specific text and the product-specific text,
      extracting, by the at least one computing device, the modifiers from the product-specific text to generate a set of modifiers, the extracted modifiers being associated with a desired sentiment,
      identifying, by the at least one computing device, transformation points in the message skeleton, the identified transformation points indicating the keywords that are candidates for modification based on the segment, and
      adding, by the at least one computing device, one or more of the extracted modifiers to one or more of the identified keywords in the message skeleton by, for each of the one or more of the identified keywords:
         generating, for each modifier in the set of modifiers, a pointwise mutual information (PMI) value for the modifier with the keyword on a right side of the modifier, and a PMI value for the modifier with a preceding word on a left side of the modifier,
         generating a subset of modifiers that includes ones of the set of modifiers having the PMI value for the modifier with the keyword on the right side of the modifier and the PMI value for the modifier with the preceding word on the left side of the modifier greater than a modification threshold value, and
         adding, to the identified keyword, one of the set of modifiers having a highest PMI value for the modifier with the keyword on the right side of the modifier; and
   causing, by the at least one computing device, the personalized textual message to be communicated to users that are included in the segment but not communicated to users that are not included in the segment.

2. The method of claim 1, the extracting the word dependencies including:
   tagging parts of speech (POS) in the segment-specific text and the product-specific text;
   identifying adjacent and non-adjacent dependencies in the tagged segment-specific text and the tagged product-specific text; and
   lemmatizing words in the tagged segment-specific text and the tagged product-specific text to normalize the words to lemmas.

3. The method of claim 1, the building the language models including:
   extracting distinct n-grams from the segment-specific text and the product-specific text;
   calculating an occurrence probability for each extracted n-gram; and
   determining the occurrence probability for all distinct modifier-keyword pairs in the language models.

4. The method of claim 1, the extracting modifiers from the product-specific text including:
   extracting sentences from the product specific text;
   determining, for each extracted sentence, an associated sentiment;
   for each extracted sentence associated with the desired sentiment:
      tagging POS for each extracted sentence; and
      extracting the modifiers from each extracted sentence.

5. The method of claim 1, the identifying transformation points in the message skeleton including:
   tagging POS in the message skeleton to identify the keywords in the message skeleton;
   computing a term weight for each identified keyword;
   comparing the computed term weight for each identified keyword to a term-weight threshold; and
   marking each keyword that has a term weight greater than the term-weight threshold as a transformation point.

6. The method of claim 1, the adding one or more of the extracted modifiers including:
   for each keyword associated with a transformation point, comparing a set of extracted modifiers to an appearance threshold; and
   adding one of the extracted modifiers that exceeds the appearance threshold to modify the keyword.

7. The method of claim 6, wherein the keywords comprise nouns, verbs, or noun phrases, and wherein for the nouns and the noun phrases the modifier is an adjective, and wherein for the verbs the modifier is an adverb.

8. The method of claim 7, wherein the keyword is the noun phrase, the adding one or more of the extracted modifiers further including:
   determining a head-word in the noun phrase, wherein the adding one of the extracted modifiers adds an adjective for the determined head-word in the noun phrase.

9. The method of claim 1, the generating the PMI value for the modifier with the preceding word on the left side of the modifier comprising generating the PMI value for the modifier with the preceding word on the left side of the modifier only if a preceding word is on the left side of the modifier, and the generating the subset of modifiers comprises generating the subset of modifiers to include ones of the set of modifiers having the PMI value for the modifier with the keyword on the right side of the modifier if a preceding word is not on the left side of the modifier.

10. The method of claim 1, the generating the PMI value for the modifier with the keyword on the right side of the modifier comprising generating the PMI value as PMI(a b) where a value p(a,b) represents a probability of co-occurrence of the keyword and the modifier in the language models, a value p(a) represents a single probability of occurrence of the keyword in the language models, a value p(b) represents a single probability of occurrence of the modifier in the language models, $$PMI(a\ b) = \log\ 2p(a,b)/p(a)p(b).$$

11. A system for controlling textual message output, the system comprising:
one or more modules implemented at least partially in hardware, the one or more modules configured to perform operations including:
retrieving, by the one or more modules, a message skeleton;
modifying, by the one or more modules, the message skeleton to generate a personalized textual message for a segment of users associated with a segment-specific text by:
extracting, by the one or more modules, word dependencies between keywords and modifiers in the segment-specific text and a product-specific text,
building, by the one or more modules, language models for the segment-specific text and the product-specific text,
extracting, by the one or more modules, the modifiers from the product-specific text to generate a set of modifiers, the extracted modifiers being associated with a desired sentiment,
identifying, by the one or more modules, transformation points in the message skeleton, the identified transformation points indicating the keywords that are candidates for modification based on the segment, and
adding, by the one or more modules, one or more of the extracted modifiers to one or more of the identified keywords in the message skeleton by, for each of the one or more of the identified keywords:
generating, for each modifier in the set of modifiers, a pointwise mutual information (PMI) value for the modifier with the keyword on a right side of the modifier, and a PMI value for the modifier with a preceding word on a left side of the modifier,
generating a subset of modifiers that includes ones of the set of modifiers having the PMI value for the modifier with the keyword on the right side of the modifier and the PMI value for the modifier with the keyword on the left side of the modifier greater than a modification threshold value, and
adding, to the identified keyword, one of the set of modifiers having a highest PMI value for the modifier with the keyword on the right side of the modifier or a highest PMI value for the modifier with the keyword on the left side of the modifier; and causing, by the one or more modules, the personalized textual message to be communicated to users that are included in the segment but not communicated to users that are not included in the segment.

12. The system of claim 11, the one or more modules further configured to:
receive a request to personalize the textual message for the one or more segments, the request identifying one or more target segments, and comprising the message skeleton; and
communicate a response to the request comprising one or more personalized messages for the target segments that are based on the received message skeleton.

13. The system of claim 11, the one or more modules configured to extract word dependencies between the keywords and the modifiers in the segment-specific text and the product-specific text are configured to:
tag parts of speech (POS) in the segment-specific text and the product-specific text;
identify adjacent and non-adjacent dependencies in the tagged segment-specific text and the tagged product-specific text; and
lemmatize words in the tagged segment-specific text and the tagged product-specific text to normalize the words to lemmas.

14. The system of claim 11, the one or more modules configured to build the language models are configured to:
extract distinct n-grams from the segment-specific text and the product-specific text;
calculate an occurrence probability for each extracted n-gram; and
determine the occurrence probability for all distinct modifier-keyword pairs in the language models.

15. The system of claim 11, the one or more modules configured to extract the modifiers from the product-specific text are configured to:
extract sentences from the product specific text;
determine, for each extracted sentence, an associated sentiment;
for each extracted sentence associated with the desired sentiment:
tag POS for each extracted sentence; and
extract the modifiers from each extracted sentence.

16. The system of claim 11, the one or more modules configured to identify the transformation points in the message skeleton are configured to:
tag POS in the message skeleton to identify the keywords in the message skeleton;
compute a term weight for each identified keyword;
compare the computed term weight for each identified keyword to a term-weight threshold; and
mark each keyword that has a term weight greater than the term-weight threshold as a transformation point.

17. A computing device comprising:
one or more processors implemented at least in part in hardware; and
a memory having instructions that, responsive to execution by the one or more processors, cause the one or more processors to:
retrieve a message skeleton;
modify the message skeleton to generate a personalized textual message for a segment of users associated with a segment-specific text by:
extracting word dependencies between keywords and modifiers in the segment-specific text and a product-specific text, building language models for the segment-specific text and the product-specific text, extracting the modifiers from the product-specific text, the extracted modifiers being associated with a desired sentiment, identifying transformation points in the message skeleton, the identified transformation points indicating the keywords that are candidates for modification based on the segment, and adding one or more of the extracted modifiers to one or more of the identified keywords in the message skeleton by, for each of the one or more of the identified keywords:

generating, for each of the extracted modifiers, a pointwise mutual information (PMI) value for the modifier with the keyword on a right side of the modifier, generating a set of modifiers that includes ones of the extracted modifiers having the PMI value for the modifier with the keyword on the right side of the modifier greater than a modification threshold value, and adding, to the identified keyword, one of the set of modifiers having a highest PMI value for the modifier with the keyword on the right side of the modifier; and causing the personalized textual message to be communicated to users that are included in the segment but not communicated to users that are not included in the segment.

18. The computing device of claim 17, the extracting the word dependencies including:

tagging parts of speech (POS) in the segment-specific text and the product-specific text;

identifying adjacent and non-adjacent dependencies in the tagged segment-specific text and the tagged product-specific text; and lemmatizing words in the tagged segment-specific text and the tagged product-specific text to normalize the words to lemmas; and the building the language models including:

extracting distinct n-grams from the segment-specific text and the product-specific text;

calculating an occurrence probability for each extracted n-gram; and determining the occurrence probability for all distinct modifier-keyword pairs in the language models.

19. The computing device of claim 17, the extracting the modifiers from the product-specific text including:

extracting sentences from the product specific text;

determining, for each extracted sentence, an associated sentiment;

for each extracted sentence associated with the desired sentiment:

tagging POS for each extracted sentence; and extracting the modifiers from each extracted sentence; and the identifying the transformation points in the message skeleton including:

tagging POS in the message skeleton to identify the keywords in the message skeleton;

computing a term weight for each identified keyword;

comparing the computed term weight for each identified keyword to a term-weight threshold; and marking each keyword that has a term weight greater than the term-weight threshold as a transformation point.

20. The computing device of claim 17, the adding one or more of the extracted modifiers to one or more of the identified keywords further including generating, for each of the extracted modifiers, a PMI value for the modifier with a preceding word on a left side of the modifier, and the generating the set of modifiers further comprising including in the set of modifiers ones of the set of modifiers having the PMI value for the modifier with the keyword on the right side of the modifier and the PMI value for the modifier with the preceding word on the left side of the modifier greater than the modification threshold value.

\* \* \* \* \*

UNITED STATES PATENT AND TRADEMARK OFFICE
CERTIFICATE OF CORRECTION

PATENT NO.       : 11,055,745 B2
APPLICATION NO.  : 14/566181
DATED            : July 6, 2021
INVENTOR(S)      : Rishiraj Saha Roy et al.

Page 1 of 1

It is certified that error appears in the above-identified patent and that said Letters Patent is hereby corrected as shown below:

In the Claims

Column 17, Line 13, after "language models," insert -- and --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*